United States Patent
Gretz (10) Patent No.: US 7,312,395 B1
(45) Date of Patent: Dec. 25, 2007

(54) ADJUSTABLE ELECTRICAL OUTLET BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/707,583

(22) Filed: Feb. 16, 2007

(51) Int. Cl.
*H01H 9/02* (2006.01)

(52) U.S. Cl. .......................... 174/54; 174/53; 174/58; 174/61; 174/64; 220/4.01; 248/906

(58) Field of Classification Search ................. 174/58, 174/53, 57, 54, 61, 63, 64, 135; 220/3.2, 220/3.3, 3.4, 3.5, 3.8, 4.01; 248/121, 126, 248/906, 200; 361/600; 439/535
See application file for complete search history.

(56) References Cited

U.S. PATENT DOCUMENTS

| | | | | |
|---|---|---|---|---|
| 2,432,555 A * | 12/1947 | Smith | .......................... | 248/27.1 |
| 3,834,658 A | 9/1974 | Theodorides | | |
| 4,057,164 A * | 11/1977 | Maier | .......................... | 220/3.6 |
| 4,080,518 A * | 3/1978 | Marrero | .................... | 200/51 R |
| 4,135,337 A * | 1/1979 | Medlin | ........................ | 220/3.3 |
| 4,612,412 A * | 9/1986 | Johnston | ...................... | 174/661 |
| 4,615,113 A * | 10/1986 | Fennel | .......................... | 29/874 |
| 4,634,015 A | 1/1987 | Taylor | | |
| 5,289,934 A | 3/1994 | Smith et al. | | |
| 6,870,101 B1 * | 3/2005 | Hull et al. | .................... | 174/58 |
| 6,878,877 B1 | 4/2005 | Cozzi et al. | | |
| 6,956,172 B2 | 10/2005 | Dinh | | |
| 7,179,994 B2 * | 2/2007 | Elberson | ...................... | 174/58 |
| 7,208,680 B2 * | 4/2007 | Drane | .......................... | 174/58 |
| 7,214,876 B1 * | 5/2007 | Haberek et al. | .............. | 174/58 |

* cited by examiner

*Primary Examiner*—Dhiru R. Patel (57) ABSTRACT

An adjustable electrical outlet box assembly for mounting a duplex receptacle or similar electrical device within a wall. The adjustable box assembly includes a metal outlet box and a bracket that can slide with respect to the box. An adjustment screw, accessible from the front of the assembly, can be rotated to move the box with respect to the stud it is secured to and thereby adjust the face of the outlet box so that it is substantially flush with the wall surface. The bracket portion of the adjustable box assembly, which may be simply stamped and formed from sheet metal, provides a front plate for securing to the front of a stud and a side plate having widely spaced ears for securing to the side of a stud. The adjustment screw engages straps that are bent outwards from the side plate to enable the bracket to slide with respect to the outlet box.

12 Claims, 10 Drawing Sheets

ADJUSTABLE ELECTRICAL OUTLET BOX ASSEMBLY

FIELD OF THE INVENTION

This invention relates to assemblies for the mounting of electrical devices and specifically to an adjustable outlet box assembly that includes a bracket and an adjusting screw for adjusting the position of the box with respect to the bracket. The adjusting screw can be used to adjust the front of the box planar with the wall surface.

BACKGROUND OF THE INVENTION

A common goal in installing electrical outlet boxes on interior walls is to install the front face of the box substantially flush with the wall surface. Conventional outlet boxes are typically fastened to a wall stud before the drywall is applied to the studs. As drywall is supplied in various thicknesses, it is difficult for the installer of the outlet boxes to position them correctly with respect to the eventual wall surface.

To provide a means of adjusting the face of the outlet box substantially flush with the wall surface, adjustable outlet boxes have been proposed. The adjustable outlet boxes typically include a bracket and a mechanism for adjusting the face of the outlet box with respect to the wall surface.

Although several adjustable outlet boxes have been proposed, there is still a need for an adjustable outlet box that can be securely fastened to a stud. Additionally, brackets suggested by the prior art are typically of complex design, which increases the production cost of the prior art brackets.

What is needed therefore is an adjustable electrical outlet box that is of simple design to enable it to be easily manufactured. Additionally, the adjustable outlet box should be capable of being securely fastened to a stud such that the box will not become loose from the supporting stud. These and other advantages can be realized with the adjustable outlet box proposed herein in the present invention.

SUMMARY OF THE INVENTION

The invention is an adjustable electrical outlet box assembly for mounting a duplex receptacle or similar electrical device within a wall. The adjustable box assembly includes a metal outlet box and a bracket that can slide with respect to the box. An adjustment screw, accessible from the front of the assembly, can be rotated to move the box with respect to the stud it is secured to and thereby adjust the face of the outlet box so that it is substantially flush with the wall surface. The bracket portion of the adjustable box assembly, which may be simply stamped and formed from sheet metal, provides a front plate for securing to the front of a stud and a side plate having widely spaced ears for securing to the side of a stud. The adjustment screw engages straps that are bent outwards from the side plate to enable the bracket to slide with respect to the outlet box.

OBJECTS AND ADVANTAGES

Several advantages are achieved with the adjustable electrical outlet box assembly of the present invention, including:

(1) The adjustable outlet box assembly is provided with an adjusting screw that is located outside of the electrical box portion of the assembly and is offset from the sidewall thereby making it easy to adjust the location of the electrical box with respect to the wall surface without having to first remove any installed electrical device from the box.

(2) The adjusting screw is not recessed within the sidewall of the electrical box. This simplifies construction of the adjustable outlet box assembly as no recess or channel need be included in the sidewall to accommodate the adjusting screw.

(3) By locating the adjusting screw outside the electrical box, usable space within the box interior is reserved for the electrical device and associated wiring and is not needlessly taken up by the adjusting screw.

(4) U-shaped channels extending outward from a sidewall of the electrical box hold a bracket that is slidable with respect to the box. By providing channels that extend outside the electrical box, the channels need not be formed in the sidewalls of the box thereby reducing interior box volume.

(5) The adjustable outlet box assembly of the present invention can be produced economically by simply stamping and bending the major portions, including three panels and a bracket, from sheet metal.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | adjustable electrical outlet box assembly |
| 22 | box member |
| 24 | bracket |
| 26 | first side of box member |
| 28 | adjusting screw |
| 30 | main panel |
| 32 | first side panel or first sidewall |
| 34 | second side panel |
| 36 | top wall |
| 38 | bottom wall |
| 40 | back wall |
| 42 | front portion of top wall |
| 44 | rear portion of top wall |
| 46 | removable wall portion |
| 48 | top edge of first side panel |
| 50 | bottom edge of first side panel |
| 52 | aperture in first side panel |
| 54 | U-shaped channel |
| 56 | front edge of first side panel |
| 58 | lip |
| 60 | V-shaped outer edge |
| 62 | middle of lip |
| 64 | top edge of second side panel |
| 66 | bottom edge |
| 68 | first portion of bracket |
| 70 | plate edge |
| 72 | ear |
| 74 | aperture in ear |
| 76 | tab |
| 78 | front edge of first portion of bracket |
| 80 | flange |
| 82 | aperture in flange |
| 84 | outer surface of tab |
| 86 | outer surface of ear |
| 88 | spike |
| 90 | strap |
| 92 | front edge of box member |
| 94 | arm |
| 95 | aperture in arm |
| 96 | smooth base portion of adjusting screw |
| 98 | threaded portion |
| 100 | collar |
| 102 | directional arrow |
| 104 | wall stud |
| 106 | front of stud |
| 108 | side of stud |
| 110 | fastener |
| 112 | cutout portion |
| D1 | offset of tabs from front edge of box member |
| D2 | offset of adjusting screw from box member |
| D3 | offset of box member from side of wall stud |

DETAILED DESCRIPTION OF THE INVENTION

Figure 1:
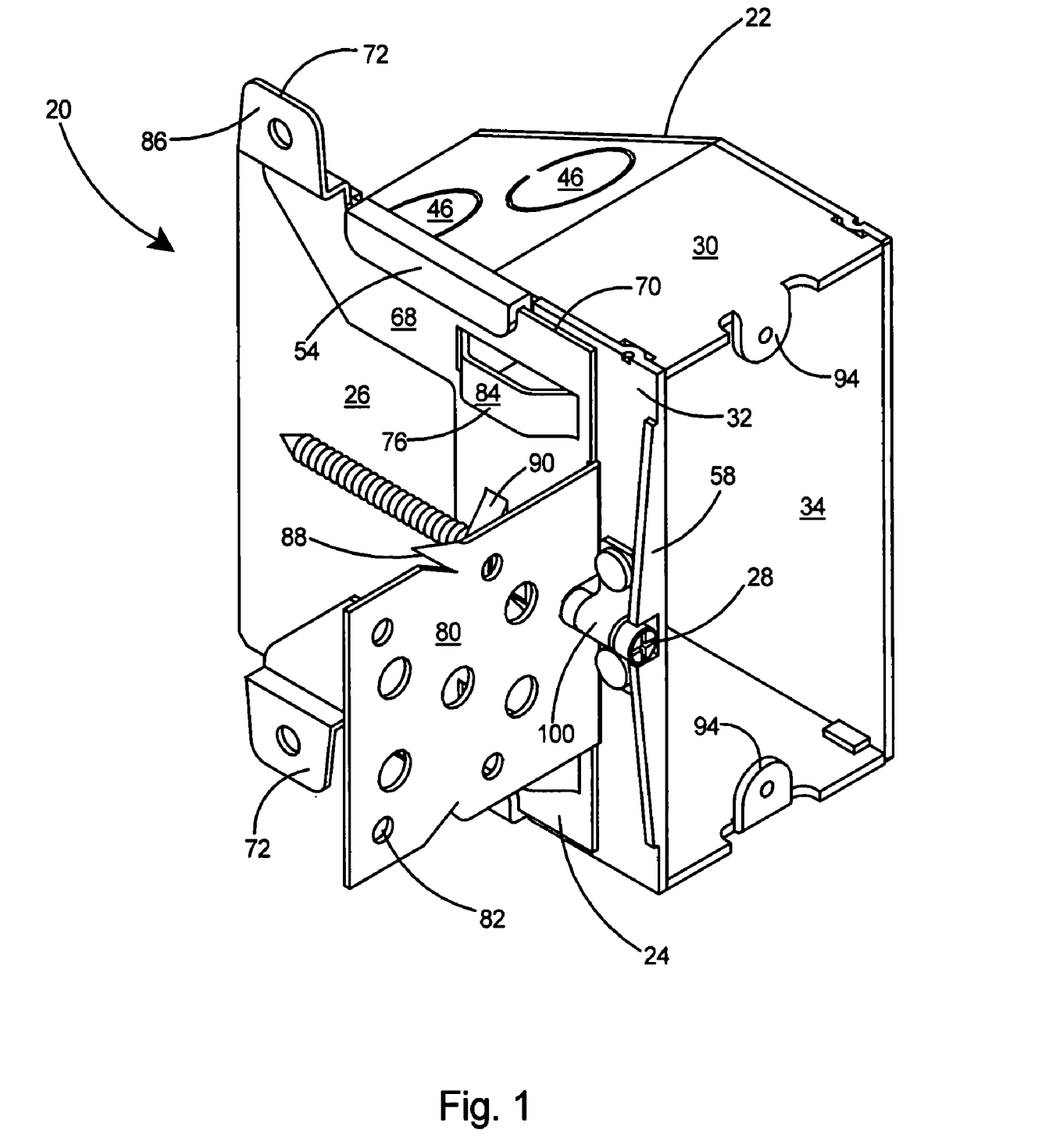
FIG. 1 is a perspective view of a preferred embodiment of an adjustable outlet box assembly according to the present invention.

With reference to FIG. 1 there is shown a preferred embodiment of an adjustable outlet box assembly 20 according to the present invention. The adjustable outlet box assembly 20 includes a box member 22 and a bracket 24 that is slidable along a first side 26 of the box member 22 and can be adjusted in position with respect to the box member 22 by and adjusting screw 28. The box member includes a main panel 30, a first side panel or a first sidewall 32, and second side panel 34.

Figure 2:
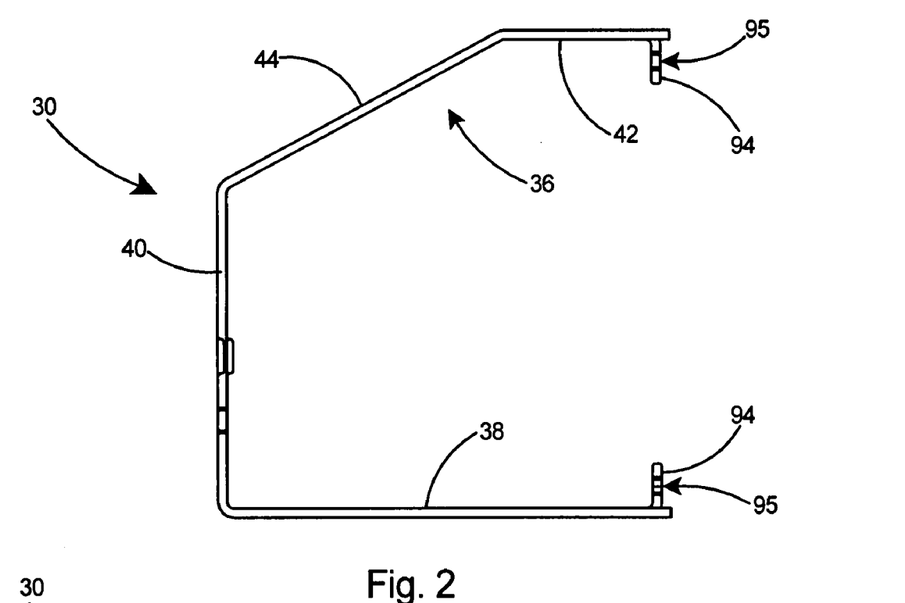
FIG. 2 is a side view of a main panel portion of the adjustable outlet box assembly of FIG. 1.
Figure 3:
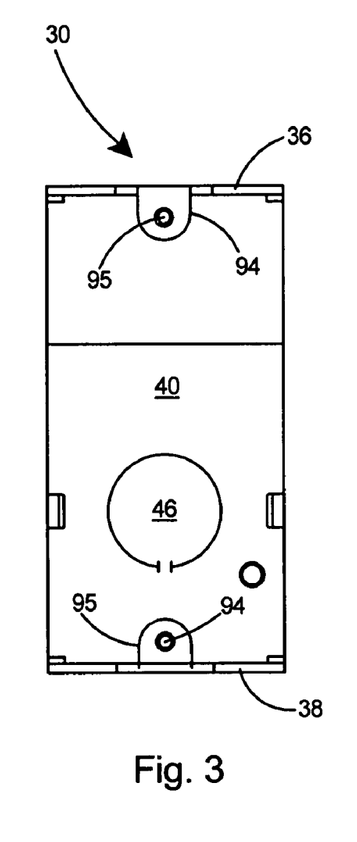
FIG. 3 is a front view of the main panel of FIG. 2.
Figure 4:
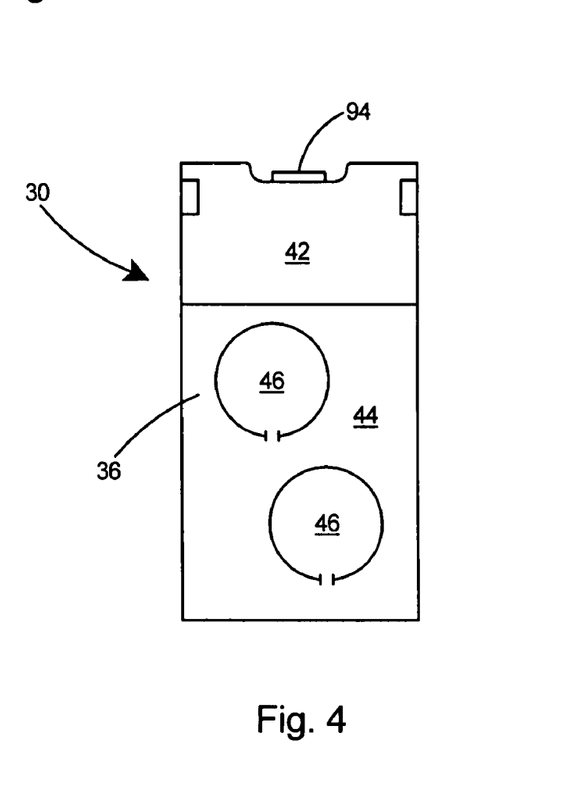
FIG. 4 is a top view of the main panel of FIG. 2.

The main panel 30, as shown in FIGS. 2-4 includes a top wall 36, a bottom wall 38, and a back wall 40. The top wall 36 includes a front portion 42 that is parallel to the bottom wall 38 and a rear portion 44 that slopes downward from the front portion 42 to the back wall 40. One or more knockouts or removable wall portions 46 are provided in the rear portion 44 of the top wall 36 and in the back wall 40.

Figure 5:
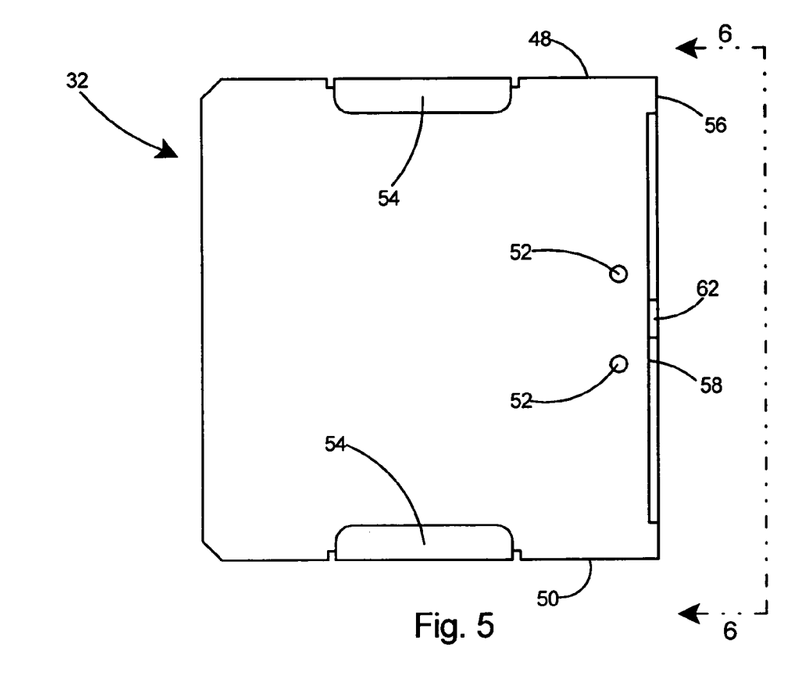
FIG. 5 is a plan view of a first panel that forms the left side of the adjustable outlet box assembly of FIG. 1.
Figure 6:
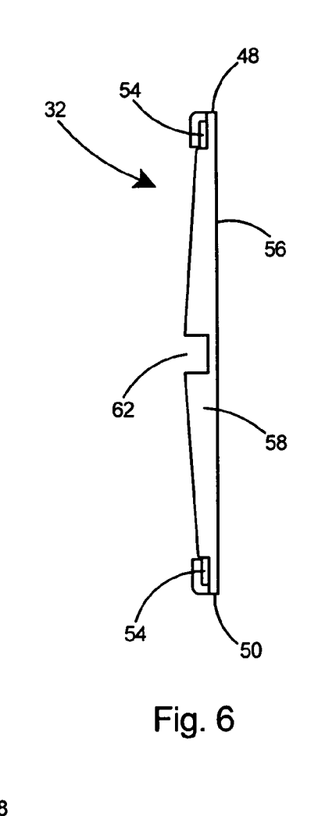
FIG. 6 is a front view of the first panel of FIG. 5 as taken from line 6-6 of FIG. 5.
Figure 7:
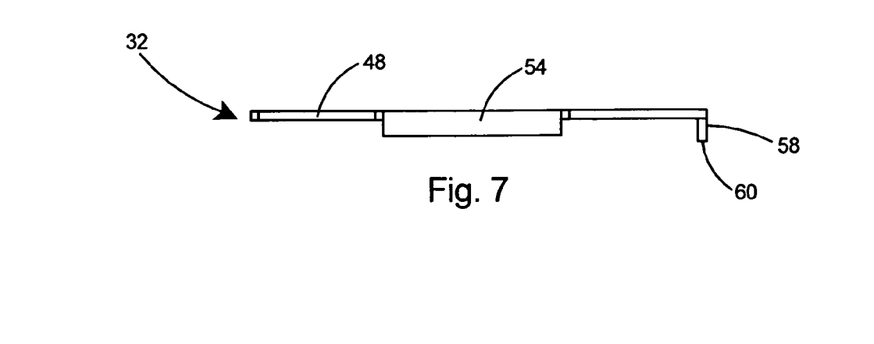
FIG. 7 is a top view of the first panel of FIG. 5.

Referring to FIGS. 5-7, the first side panel 32 includes a top edge 48, a bottom edge 50, apertures 52, and a U-shaped channel 54 extending outward from the top edge 48 and from the bottom edge 50. The first side panel 32 further includes a front edge 56 and a lip 58 extending outward from the front edge 56 orthogonal to the panel 32. The lip 58 includes a substantially V-shaped outer edge 60 with the middle 62 of the lip 58 substantially centered vertically along the first sidewall panel 32 (see FIG. 15).

Figure 8:
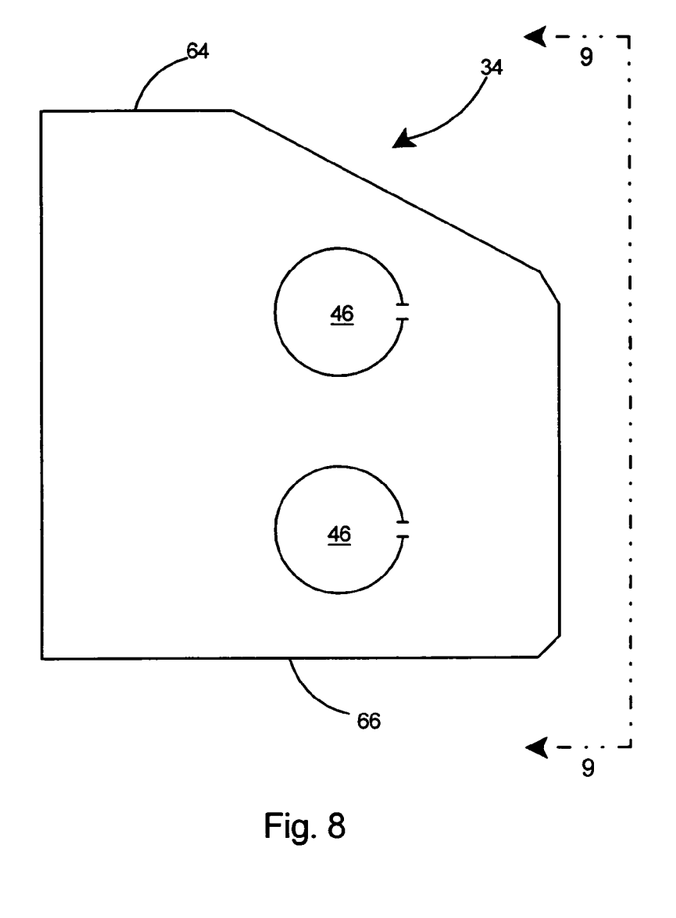
FIG. 8 is a plan view of a second panel that forms the right side of the adjustable outlet box assembly of FIG. 1.
Figure 9:
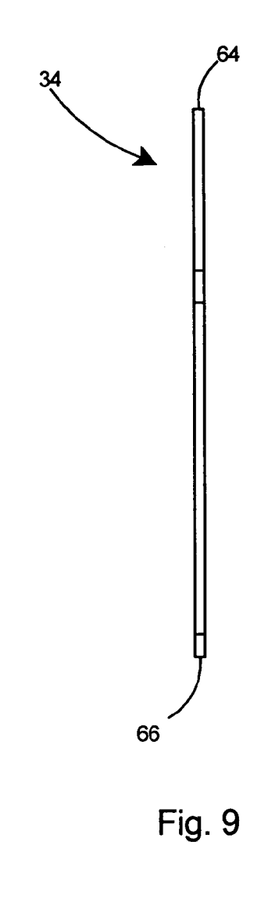
FIG. 9 is an end view of the second panel as taken from line 9-9 of FIG. 8.

With reference to FIGS. 8 and 9, the second side panel 34 includes a top edge 64, bottom edge 66, and removable wall portions 46 therein.

Figure 10:
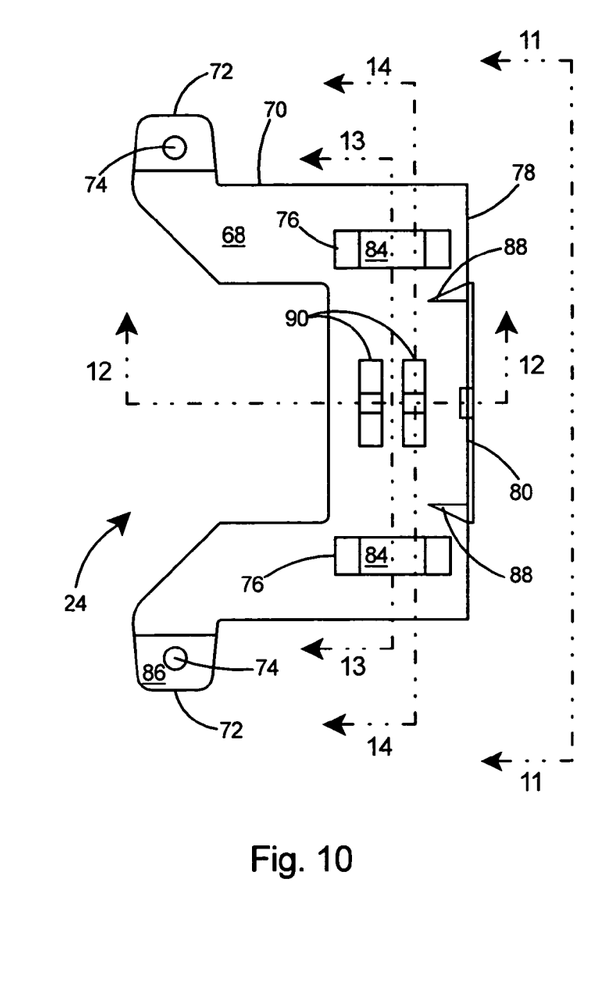
FIG. 10 is a plan view of a bracket that forms the left side of the adjustable outlet box assembly of FIG. 1.
Figure 11:
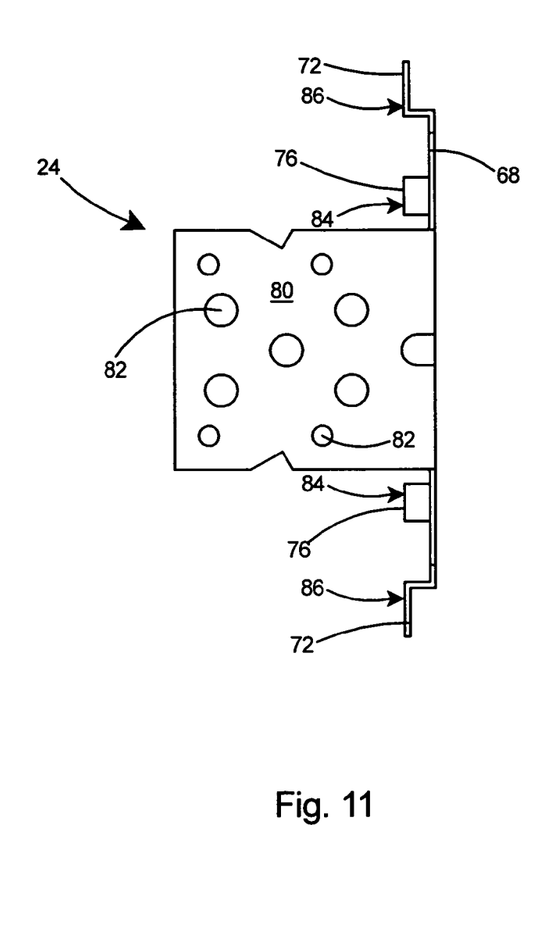
FIG. 11 is a front view of the bracket as taken from line 11-11 of FIG. 10.

As shown in FIGS. 10 and 11, the bracket 24 includes a substantially flat first portion 68, top and bottom plate edges 70, ears 72 extending substantially outward of the flat first portion 68, and apertures 74 therein in each of the ears 72. One or more tabs 76 are provided on the bracket 24 extending outward from the first portion 68 of the bracket. The first portion 68 of the bracket 24 includes a front edge 78 and a second portion or flange 80 extending outward orthogonally from the front edge 78. The flange 80 includes apertures 82 therein. As shown in FIG. 11, the tabs 76 include an outer surface 84, the ears 72 include an outer surface 86, and the outer surfaces 84 of the tabs 76 are planar with the outer surfaces 86 of the ears 72.

Figure 12:
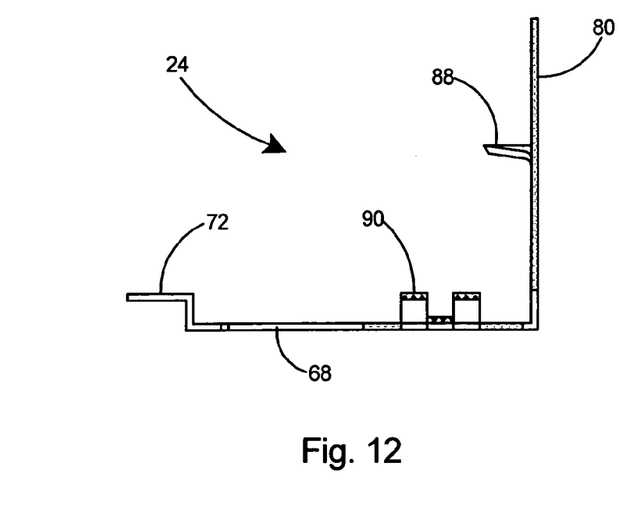
FIG. 12 is a sectional view of the bracket as taken along line 12-12 of FIG. 10.
Figure 13:
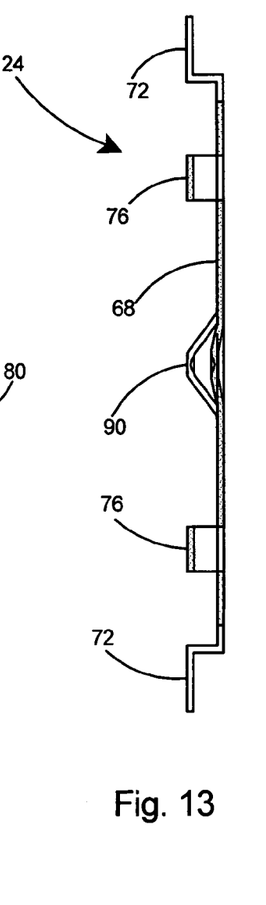
FIG. 13 is a sectional view of the bracket as taken along line 13-13 of FIG. 10.
Figure 14:
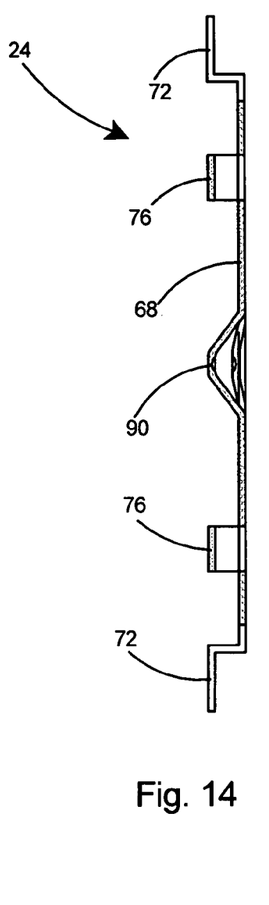
FIG. 14 is a sectional view of the bracket as taken along line 14-14 of FIG. 10.

As shown in FIGS. 12-14, the bracket 24 further includes one or more pointed spikes 88 extending rearward from the flange 80, the pointed spikes 88 bent rearward from the plane of the flange 80. One or more a straps 90 extend outward from the first portion 68 of the bracket 24.

Figure 15:
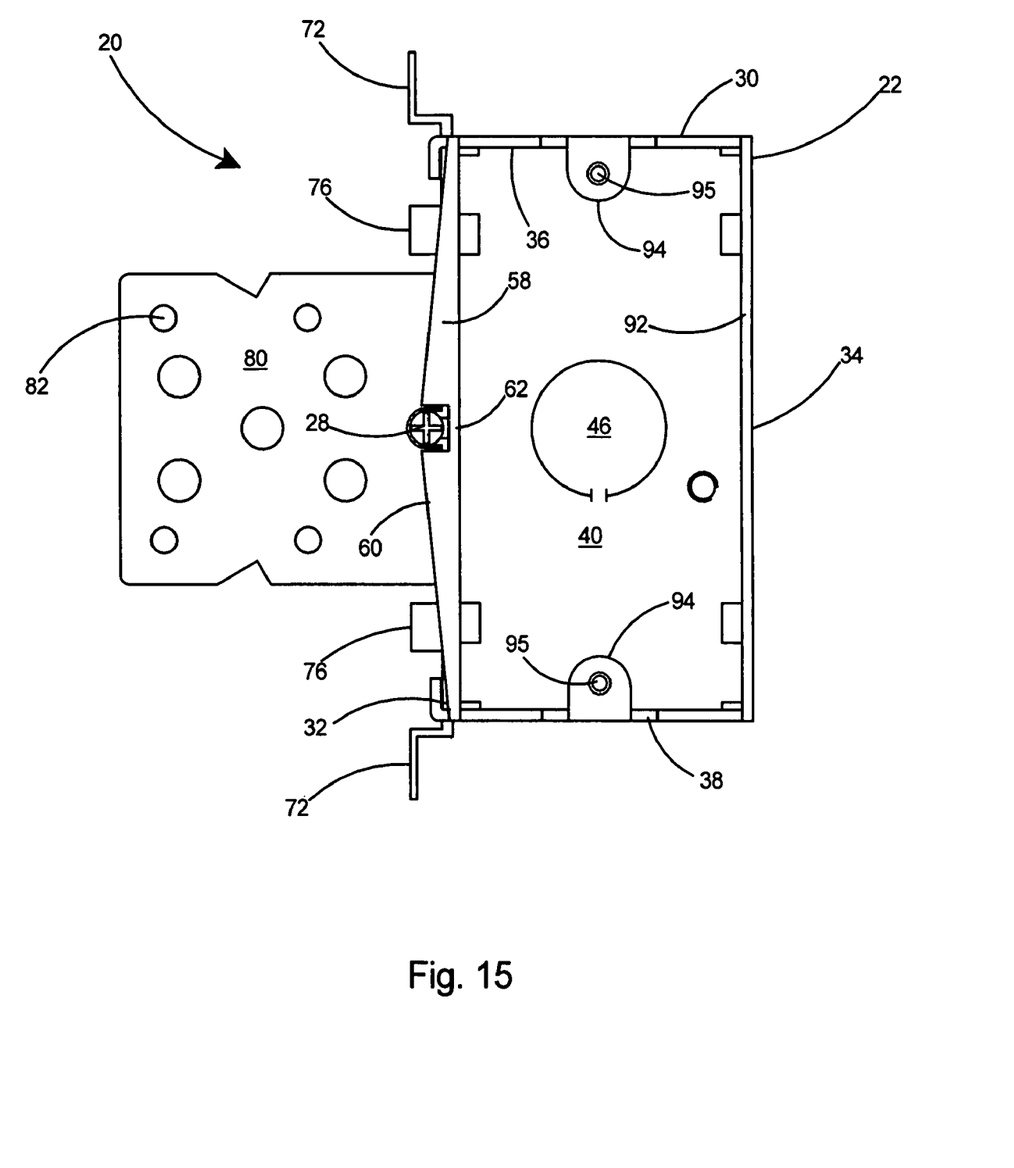
FIG. 15 is a front view of the adjustable outlet box assembly of FIG. 1.

The adjustable outlet box assembly 20 is provided in assembled form as shown in FIG. 15. The main panel 30, first side panel 32, and second side panel 34, which may be formed of metal, are secured together to form the adjustable outlet box assembly 20. The box member 22 portion of the outlet box assembly 20 includes a front edge 92 and arms 94 extending inward of the box member 22 from the top wall 36 and the bottom wall 38. The arms 94 include apertures 95 therein for receiving fasteners for later connecting an electrical device (not shown) thereto.

Figure 16:
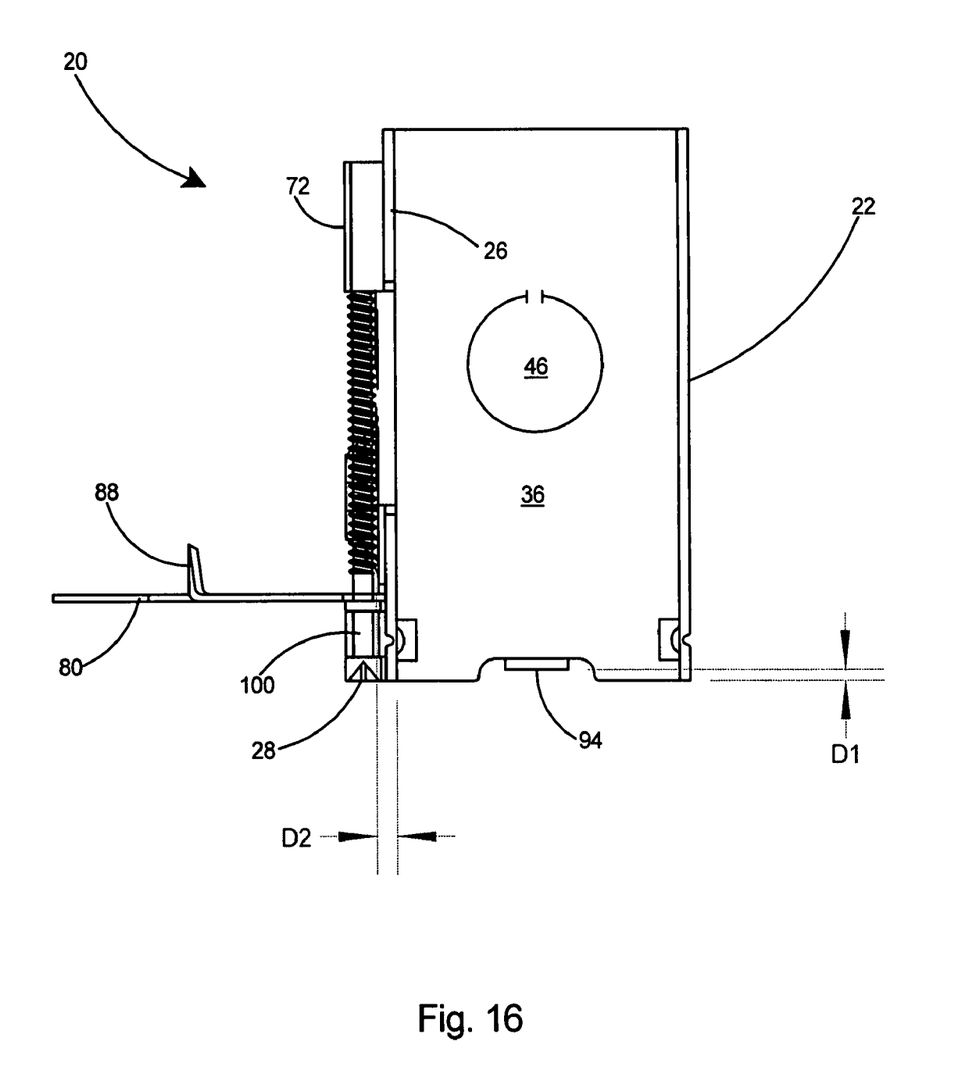
FIG. 16 is a top view of the adjustable outlet box assembly of FIG. 1.

As shown in FIG. 16, the arms 94 extending from the box member 22 portion of the adjustable outlet box assembly 20 are offset by distance D1 from the front edge 92 of the box member 22. The adjusting screw 28 is offset by distance D2 from the first side 26 of the box member 22.

Figure 17:
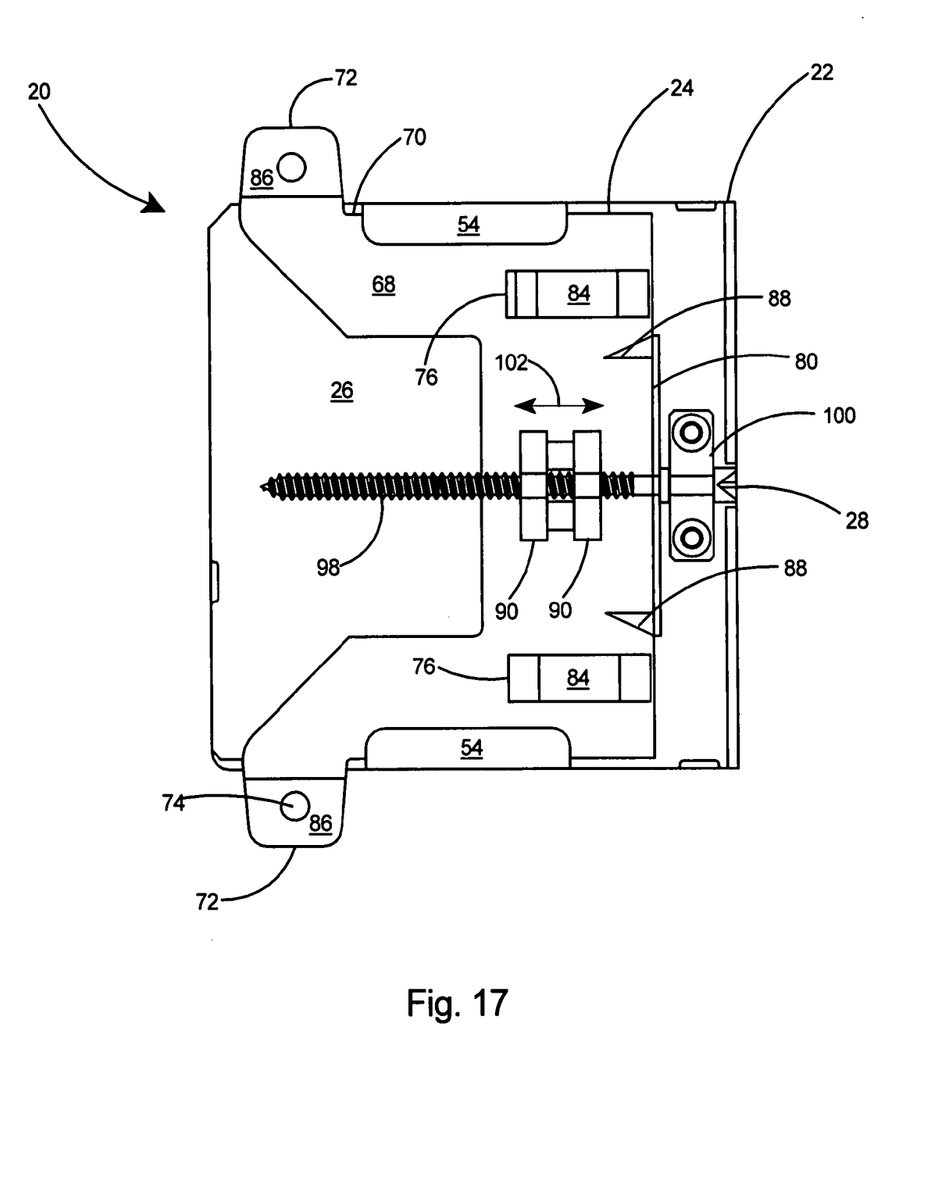
FIG. 17 is a side view of the adjustable outlet box assembly as taken from the left side of FIG. 1.

With reference to FIG. 17, the edges 70 of the bracket 24 are slidably disposed within the U-shaped channels 54 of the first side 26 of the box member 22. The adjusting screw 28 includes a smooth base portion 96 and a threaded portion 98. The smooth base portion 96 is held secure to box member 22 by a collar 100 secured to the first sidewall 26. The adjusting screw 28 is therefore free to rotate within the collar 100 without axial movement with respect to the box member 22. The straps 90 of the bracket 24 engage the threaded portion 98 of the adjusting screw 28. Rotation of the adjusting screw 28 therefore moves the box member 22 linearly with respect to the bracket 24 with the direction of the movement, denoted by directional arrow 102, determined by the direction of rotation of the adjusting screw.

Figure 18:
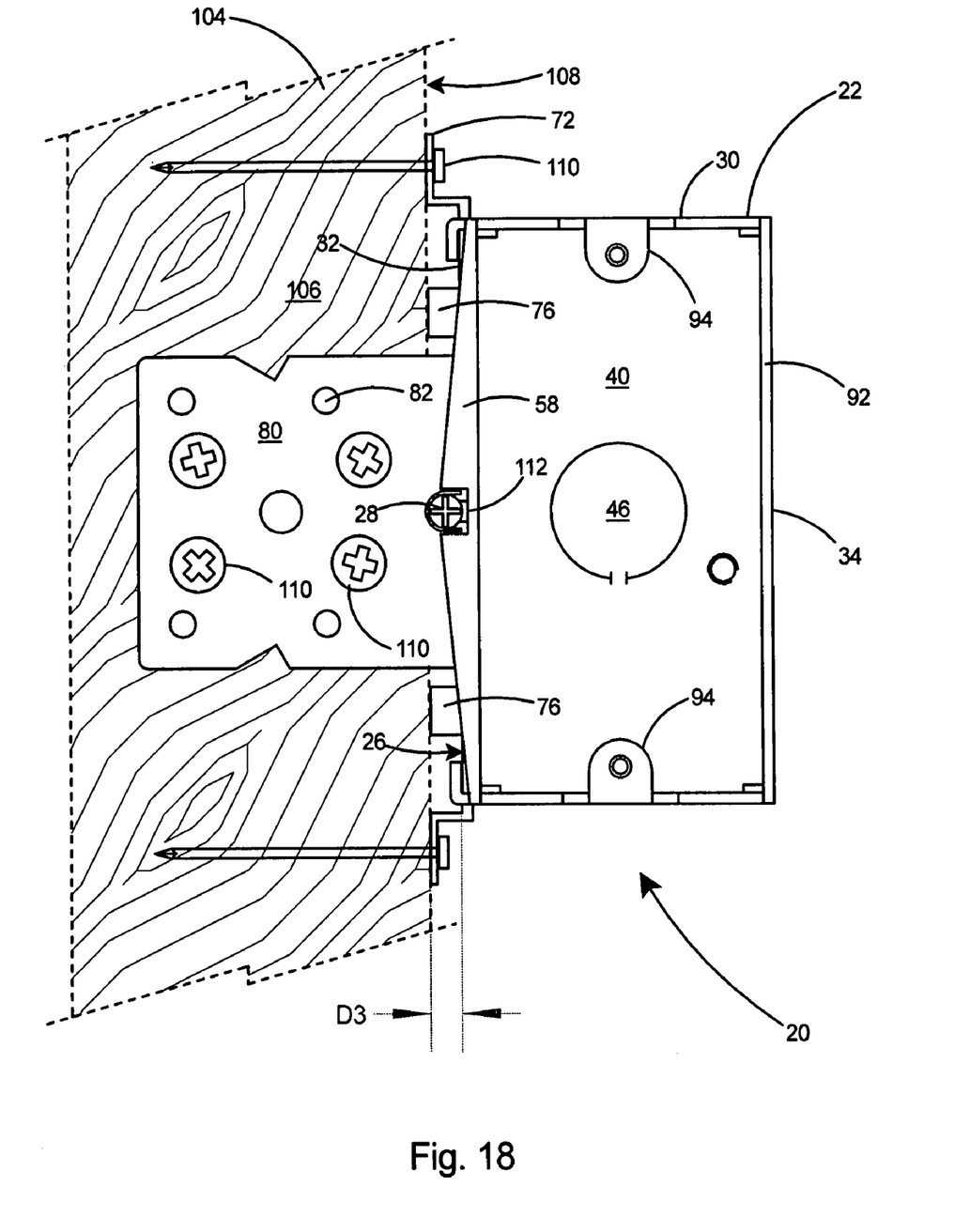
FIG. 18 is a front view of the adjustable outlet box assembly of the present invention secured to a stud.

Referring to FIG. 18 for the operation of the present invention, the adjustable outlet box assembly 20 is placed against a wall stud 104 with the back side of the flange 80 against the front 106 of the stud and the tabs 76 and the ears 72 flush against the side 108 of the stud 104. The spikes 88 (see FIG. 17) extending from the flange 80 are pushed into the stud 104 to temporarily hold the assembly 20 to the stud 104. The adjustable outlet box assembly 20 is then secured to the side 108 of the stud 104 by fasteners 110 secured through ears 72 and to the front 106 of the wall stud 104 by fasteners 110 through the flange 80 portion of the bracket 24.

The fasteners 110 could be either nails or screws. The outlet box assembly 20 is in contact and flush against the side 108 of the wall stud 104 at the outer surfaces of both the tabs 76 and the ears 72. The tabs 76 and the ears 72 offset the box assembly 20 at a distance D3 from the side 108 of the wall stud 104. The offset distance D3 thereby provides clearance along the first side 26 of the box member 22 for the adjusting screw 28. Lip 58 includes a cutout portion 112 to enable easy access to the adjusting screw 28 from the front of the box member 22.

With reference to FIG. 18, after the adjustable outlet box assembly 20 is secured to the stud 104 and sheetrock (not shown) or other wall coverings are typically secured over the front edge 92 or face of the box assembly 20. The sheetrock is then typically cut around the periphery of the box member 22 with an automated cutter to expose the electrical box. The lip 58 of the box member 22 is provided on the electrical box to act as a template to guide the blade of the automated cutter around the periphery of the box member 22 and prevent the blade from contacting the adjusting screw 28. After the box member 22 has been exposed, the adjusting screw 28 can then be turned to adjust the front edge 92 of the box member 22 with respect to the wall surface. The front edge 92 of the box member 22 is typically adjusted until it is approximately flush with the wall surface.

One advantage of the adjustable outlet box assembly 20 is that the position of the box member 22 relative to the wall surface can be adjusted after the original installation. A further advantage is that the adjusting screw 28 is located outside the walls of the box member 22, therefore making it easy to adjust the position of the box member 22 without removing the electrical device (not shown) from the box. Many prior art adjustable electrical boxes include an adjusting mechanism that is inside the box thereby making it difficult to adjust the box without first removing the electrical device from the box.

Preferably the panels 30, 32, and 34 of the adjustable outlet box assembly 20 of the present invention are constructed of metal and are secured together by tack welding, fasteners, or similar fastening arrangements to form the box member 22. The bracket 24 (see FIGS. 10-14) is also preferably constructed of metal. The panels 30, 32, and 34 and bracket 24 can all be formed from flat metal plate or sheet metal by simply stamping and bending the individual pieces. Most preferably, the panels and bracket are constructed of galvanized steel having a minimum thickness of 0.062 inch or of plated 1010 steel with a minimum thickness of 0.062 inch and with zinc plating having a minimum thickness of 0.0005 inch. Simple construction from sheet metal enables the adjustable outlet box assembly 20 to be produced economically.

Having thus described the invention with reference to a preferred embodiment, it is to be understood that the invention is not so limited by the description herein but is defined as follows by the appended claims.

What is claimed is:

1. An adjustable outlet box assembly comprising:
   a box member including a first sidewall having a top edge and a bottom edge;
   a U-shaped channel extending outward from said top edge and from said bottom edge of said first sidewall;
   a bracket having a substantially flat first portion including plate edges slidably disposed in said U-shaped channels;
   said first portion of said bracket includes a front edge;
   said bracket includes a flange extending outward orthogonally from said front edge of said first portion, said flange including an aperture therein for receipt of a fastener;
   an adjusting screw offset outwards from said first portion of said bracket for adjusting the position of said bracket with respect to said box member;
   said adjusting screw including a smooth base portion free to rotate with respect to said box member without axial movement with respect thereto;
   said adjusting screw including a threaded portion engaged by said bracket whereby rotation of said adjusting screw moves said box member with respect to said bracket with the direction of said movement determined by the direction of rotation of said adjusting screw.

2. The adjustable outlet box assembly of claim 1 including ears extending substantially outward of said flat first portion of said bracket; and
   an aperture in said ears for receipt of a fastener.

3. The adjustable outlet box assembly of claim 2 including one or more tabs extending outward from said first portion of said bracket, said tabs having an outer surface;
   an outer surface on said ears; and
   said outer surface of said tabs is planar with said outer surface of said ears.

4. The adjustable outlet box assembly of claim 1 wherein said box member includes a collar extending outward from said first sidewall; and
   said base portion of said adjusting screw is received therein in said collar of said box member.

5. The adjustable outlet box assembly of claim 1 including a strap extending outward from said first portion of said bracket and engaging said threaded portion of said adjusting screw such that rotation of said adjusting screw causes axial movement of said screw with respect to said strap and linear movement of said bracket along said first sidewall.

6. The adjustable outlet box assembly of claim 1 including a pointed spike extending rearward from said flange, said pointed spike bent rearward from the plane of said flange.

7. The adjustable outlet box assembly of claim 1 including
   a front edge on said first sidewall of said box member;
   a lip extending outward from said front edge of said first sidewall; and
   said lip including a substantially V-shaped outer edge with the center of said V-shaped outer edge substantially centered vertically along said first sidewall of said box member.

8. The adjustable outlet box assembly of claim 1 wherein said box member includes a top wall, a bottom wall, and a back wall; and
   said top wall includes a front portion parallel to said bottom wall and a rear portion sloping downward from said front portion to said back wall.

9. The adjustable outlet box assembly of claim 8 including a removable wall portion in said rear portion of said top wall of said box member.

10. The adjustable outlet box assembly of claim 8 including
    a front edge on said box member;
    arms on said box member extending inward from said top wall and said bottom wall; and
    apertures therein in said arms for receiving fasteners for connecting an electrical device thereto.

11. The adjustable outlet box assembly of claim 10 wherein said arms of said box member are offset from said front edge of said box member.

12. An adjustable outlet box assembly comprising:
    a box member including a first sidewall having a top edge and a bottom edge;
    a U-shaped channel extending outward from said top edge and from said bottom edge of said first sidewall;

a bracket having a substantially flat first portion including plate edges slidably disposed in said U-shaped channels, said bracket including a front edge and a rear edge;

said first portion of said bracket includes a front edge;

said bracket includes a flange extending outward orthogonally from said front edge of said first portion, said flange including an aperture therein for receipt of a fastener;

ears extending substantially outward of said flat first portion of said bracket at said rear edge, said ears including an outer surface;

tabs extending outward from said first portion of said bracket, said tabs having an outer surface;

said outer surface of said labs planar with said outer surface of said ears;

an adjusting screw offset outwards from said first portion of said bracket for adjusting the position of said box member with respect to said bracket with the direction of said movement determined by the direction of rotation of said adjusting screw.

* * * * *